United States Patent [19]

Wittebol

[11] 3,823,256

[45] July 9, 1974

[54] DATA SWITCHING SYSTEM

[75] Inventor: Rudolph Louis Wittebol, Hilversum, Netherlands

[73] Assignee: U.S. Philips Corporation, New York, N.Y.

[22] Filed: Jan. 2, 1973

[21] Appl. No.: 320,169

[30] Foreign Application Priority Data

Jan. 11, 1972 Netherlands ........................ 7200352

[52] U.S. Cl. .................................................... 178/3

[51] Int. Cl. ............................................ H04l 5/24

[58] Field of Search........... 178/17.5, 2 R, 2 C, 2 D, 178/2 E, 3, 4.1 R, 4.1 B, 4.1 C; 179/2 DP, 18 ES

[56] References Cited

UNITED STATES PATENTS

| | | | |
|---|---|---|---|
| 3,469,021 | 9/1969 | Dahlblom et al. | 178/3 |
| 3,502,808 | 3/1970 | Brown, Jr. | 178/3 |
| 3,564,499 | 2/1971 | Ryan | 178/3 |
| 3,717,723 | 2/1973 | Jaskulke et al. | 178/3 |

*Primary Examiner*—Thomas A. Robinson
*Attorney, Agent, or Firm*—Frank R. Trifari; Simon L. Cohen

[57] ABSTRACT

A description is given of a data switching system for switching direct connections between TELEX lines by way of a central processor. The system configuration of a message switching system is used as a basis. The communication lines are connected to communication units which send request signals to the central processor when a character is received or transmitted. Registers of the central store are permanently associated with the communication lines. In the register of the receive line the address of the register of the send line is stored. The latter register comprises a number of character locations for storing characters. In reaction to the request signals, the central processor transfers the characters from the communication unit to the register of the send line or conversely.

4 Claims, 4 Drawing Figures

DATA SWITCHING SYSTEM

The invention relates to a data switching system for establishing communication connections between communication lines through which data signals are received (receive lines) and lines through which data signals are transmitted (send lines). The said lines are connected to communication units which, after reception of a given quantity of data (a character) or after transmission of a character, send a request signal to a central processor which successively grants the communication units which send a request signal access to the central store for transferring a character from the communication unit to the central store or vice versa. An incoming and an outgoing line register of the central store is permanently associated with each of the said receive lines and send lines, respectively.

In a known data switching system of this kind, the messages which are received from the lines are stored in their entirety in a store, such as a drum store, before the messages are transmitted. According to this method no direct connection between two lines is obtained. Data switching systems of this kind are referred to as "store and forward" switching systems.

The invention has for its object to provide a data switching system of the kind set forth by means of which direct connections can be established between two lines, in particular for use in TELEX networks.

The data switching system according to the invention is characterized in that in the case of a connection between a receive line and a send line the address of the outgoing line register is stored in the incoming line register of the connection. The outgoing line register comprises a number of character locations for storing characters. The central processor reacts to a request signal originating from the incoming side of a connection by reading the contents of the incoming line register of the connection, by subsequently selecting the outgoing line register whose address is specified by the contents of the incoming line register, and by subsequently storing the received character in a character location of the outgoing line register. The central processor reacts to a request signal originating from the outgoing side of a connection by reading the contents of the outgoing line register of the connection and by subsequently transferring a character from a character location of the outgoing line register to the communication unit from which the request signal originates.

An electronic TELEX exchange has already been proposed in which the direct connections are established via the central store of a central processor. The messages are exchanged therein via a register which is allotted anew for each connection. The data switching system according to the invention, however, uses for the connections registers which are permanently associated with the lines, so that a simpler construction results.

FIG. 1 is a basic representation of the construction of a data switching system for the switching of messages.

Figure 1:
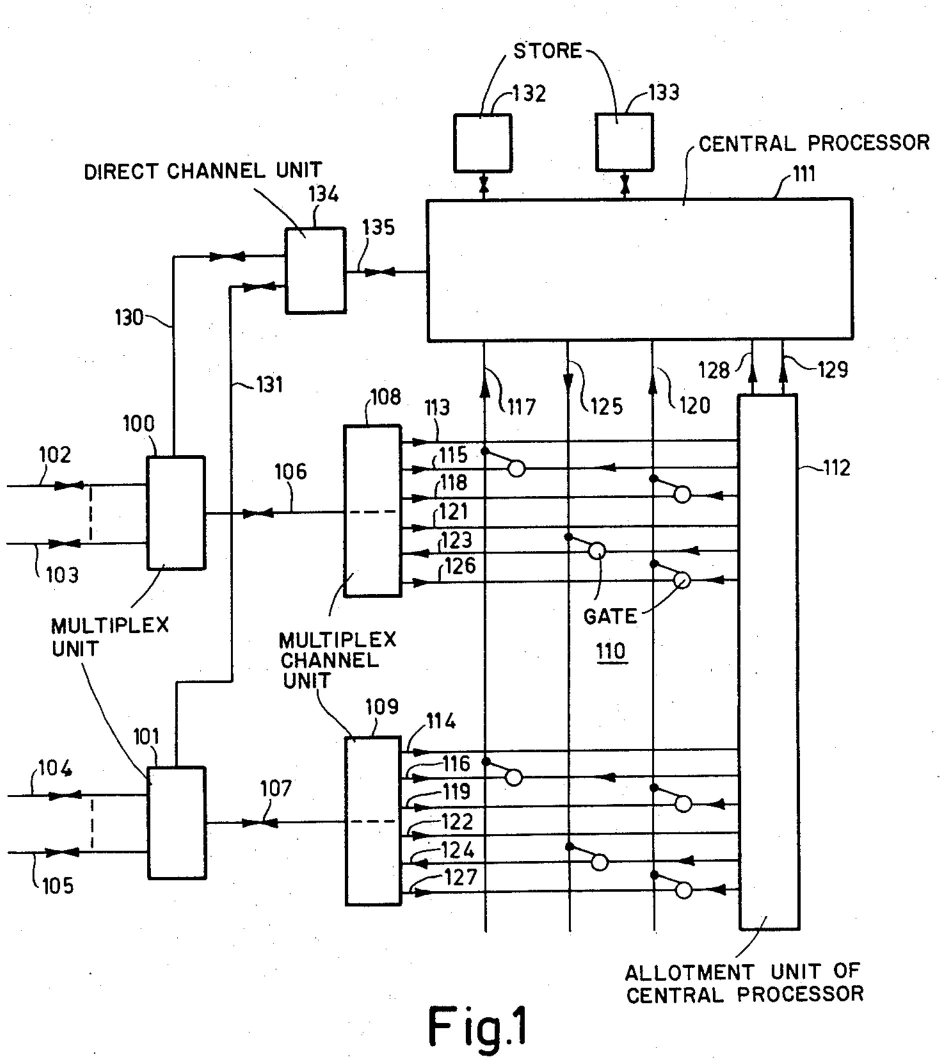
FIG. 1 is a block diagram of a data switching system.

The references 100 and 101 denote "multiplex units." A group of telegraph lines is connected to each multiplex unit. In practice a group comprises, for example, 128 duplex lines having a transmission rate of 50 Bauds. Only a few telegraph lines are shown. These lines are provided with the references 102 and 103 as far as multiplex unit 100 is concerned, and with references 104 and 105 as far as multiplex unit 101 is concerned.

Each multiplex unit is connected to a multiplex channel, which terminates in a "multiplex channel unit." The multiplex channels are provided with the references 106 and 107; the multiplex channel units are provided with the references 108 and 109.

The multiplex channel units are connected to a switching unit 110, which can establish connections between these multiplex channel units and the central processor 111. The switching unit establishes the connections according to the "one-at-a-time" principle under the control of the "allotment unit" 112. This allotment unit controls the access to the central store of the central processor in raction to requests which are generated by equipment and programs. The allotment unit actually forms part of the central processor.

A multiplex unit 100; 101, assembles the character elements received from each telegraph line to form telegraph characters, and successively transfers the characters, received from all telegraph lines, to the multiplex channel 106; 107. The number of the telegraph line is transferred simultaneously with each character.

A multiplex channel unit 108; 109 reacts to the reception of a character by transmitting a "request signal," by way of a "request line" 113; 114, to the allotment unit 112. The requests originating from the multiplex channel units are treated by the allotment unit 112 with a high priority, i.e., directly after termination of the execution of an instruction of the current program of the central processor.

Directly after termination of the execution of an instruction and when no requests of a higher priority are present, the allotment unit 112 transmits control signals to the switching unit 110 for connecting the multiplex channel unit which generated the request to the central processor. The connection is established via gates (represented in the figure by small circles) which are connected between the data outputs 115 and 116 of the multiplex channel units and the data input 117 of the central processor, and between the "address outputs" 118 and 119 of the multiplex channel units and the address input 120 of the central processor. These gates are controlled by the allotment unit 112. In a multiplex channel unit the "address" of a storage location of the central store is formed from the number of the telegraph line. The storage location is permanently associated with the telegraph line. This address is applied to the address output 118; 119 and is transferred, after a connection has been established, to the address input 120 of the central processor.

The transmission of characters by way of the telegraph lines is effected in that a multiplex unit decomposes a character which is ready for transmission into character elements and successively supplies these elements to the telegraph transmitter of the telegraph line. During the transmission of a character, the multiplex unit transmits a "request for a new character" to the relevant multiplex channel unit. This request is accompanied by the number of the telegraph line. Therefrom, the multiplex channel unit forms the address of a storage location of the central store, the said storage location being permanently associated with the telegraph line. (This is a storage location other than in the case where a character is received from the telegraph line).

A multiplex channel unit reacts to the reception of a "request for a new character" by transmitting a request signal, via a request line 121; 122, to the allotment unit 112. These requests are dealt with by the allotment unit in the same manner as the requests which result from the reception of characters; however, the priority is lower. In the case of the transmission of characters, a connection is established by way of gates which are connected between the data inputs 123 and 124 of the multiplex channel units and the data output 125 of the central processor, and between the address outputs 126 and 127 of the multiplex channel units and the address input 120 of the central processor. This connection is also established in the case of reception of characters so as to enable transmission of special signals such as the so-termed "lost character signal" to a multiplex unit. (This signal is sent to the multiplex unit if a received character cannot be processed by the central processor so that it will be lost).

The transport of a character from a telegraph line to the central store will be referred to hereinafter as "incoming transport." The transport in the opposite direction will be referred to as "outgoing transport." The kind of transport is announced to the central processor by the allotment unit 112 via the line 128 (incoming transport) and the line 129 (outgoing transport).

The central processor 111 can transmit commands to the multiplex units 100 and 101 via a so-termed "direct channel" 135 which is connected to a "direct channel unit" 134. This channel unit has a connection with each of the multiplex units (references 130 and 131). In the reverse direction, the multiplex units can make special announcements to the central processor. These special announcements are preceded by a so-termed "program interrupt request." The central processor reacts thereto by requesting the special announcement. A feasible command is, for example: "start the transmission of characters." This command is given prior to the transmission of a message and sets the multiplex unit to the state with respect to a given telegraph line such that for this telegraph line a "request for a new character" is transmitted to the central processor during the transmission of the character. A feasible special announcement is, for example: "the last character of a message has been transmitted." Other commands and announcements relate to the signalling procedures of TELEX lines.

More details concerning the function and operation of the multiplex units can be found in the publication: Philips Telecommunication Review, Vol. 28, No. 4, December 1969, pages 175–183. This publication demonstrates that multiplex units which, when characters are received, transmit these characters, together with the number of the telegraph line, to the central processor and which, when characters are transmitted, automatically request new characters, are well known devices which need not be elaborated upon in this context.

The data switching system described thus far with reference to FIG. 1 is typical of a given type of message switching system in which messages are received stored and transmitted without a direct connection being present between a telegraph line via which a message is received and the telegraph line via which the message is transmitted. The messages are usually intermediately stored in a store having a large capacity, such as a drum store or a disc store. These stores are represented in FIG. 1 by the blocks 132 and 133. The reception and the transmission of the messages is performed via the central store of the central processor.

In TELEX networks, direct connections are established between the subscribers. The messages are not intermediately stored, but are transmitted directly from subscriber to subscriber via the direct connections. In electro-mechanical TELEX exchanges, the connections are metallic circuits which are established by the switching of metallic crosspoints.

In electronic data switching systems the connections are usually distributed in time or in time and space. A given time slot of a cycle of time slots is then associated with a connection, or a given time slot and a given location in space are associated with the connection. In some data switching systems there is the additional possibility of changing the time slot at one or more locations in the spatial course of the connection. At these locations a so-termed "time slot transposition" is used, which can be realized by making use of stores. In these data switching systems in which a fixed time slot and a fixed location in space are assigned to each connection, the control information which maintains the connection must be adjusted only at the beginning of the establishment of the connection, after which it must be cyclically repeated. Such connections are also denoted as circuits.

Another possibility is to assign an arbitrary time slot to the incoming side of the connection as soon as a given quantity of information (for example, a character) has been received, to store this information in a store, and to assign a time slot to the outgoing side of the connection so as to extract the information from the store as soon as a given quantity of information has been transmitted. If the time during which the information remains in the store is short with respect to the length of the message, a quasi-direct transmission of messages than exists from the sender to the addressee. In this case the connection is a "quasi-circuit." If the message is first stored in its entirety in another store, for example, a drum store, before it is transmitted, there is no circuit. This is the case in message switching systems.

A common aspect of a quasi-circuit and a circuit is that the addressee receives a message while the sender is still transmitting. A quasi-circuit then offers the same possibilities for conversation by means of messages as a circuit, and can consequently also be used for the TELEX traffic from subscriber to subscriber. A proposal for an electronic TELEX exchange in which use is made of quasi-circuits is known from the publication: Conference Publication No. 52 of the Institution of Electrical Engineers, pages 111 – 1,115 (Conference on: Switching Techniques for Telecommunications Networks, 21–25 April 1969, London). According to this proposal, a connection is routed by way of a storage location (of the central store) which is assigned to the connection. For establishing a connection it is then necessary to perform an assignment between the incoming side of the connection and the storage location, and between the outgoing side of the connection and the storage location.

In the data switching system described with reference to FIG. 1, one storage location (of the central store) is permanently associated with each telegraph line (for switching messages) by means of an address which is formed from the line number by the multiplex channel unit 108; 109. For "incoming transports" a storage location other than that for "outgoing transports" is assigned. In the "message switching mode" the storage location associated with a telegraph line comprises a "block length counter" (BLC) and a "current address" (CA). The "current address" indicates the location in the store where the character must be stored or extracted; the "block length counter" indicates how many characters are contained in the block. (A block is a part of the central store in which a part of a message is stored. A message is usually distributed over a plurality of blocks, the said blocks being linked by the program of the central processor).

The permanent association of the storage locations with the telegraph lines is also used according to the invention for the formation of quasi-circuits between the telegraph lines in the so-termed "TELEX mode" of the data switching system. This "TELEX mode" will be described in detail hereinafter.

Figure 2:
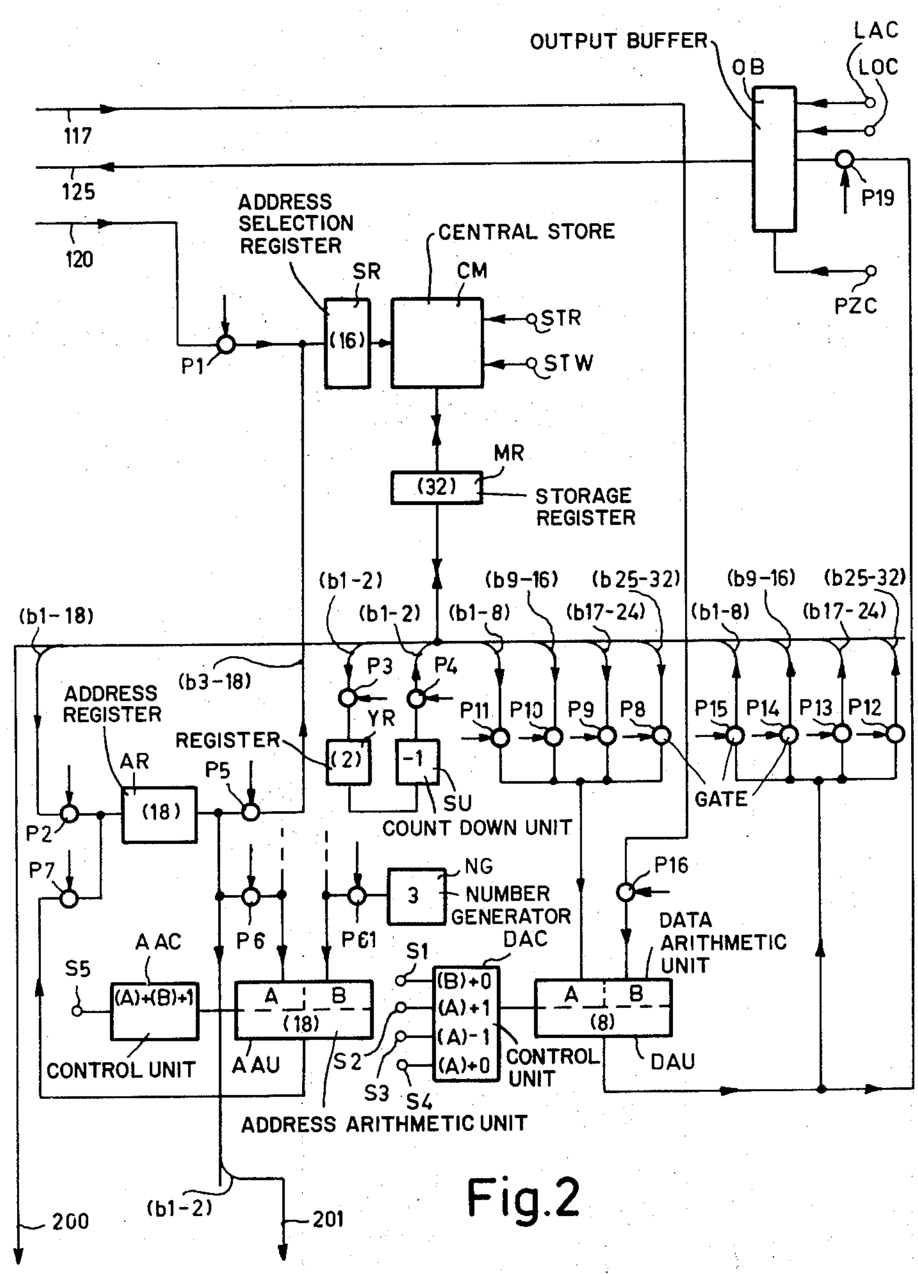
FIG. 2 is a block diagram of part of the central processor of the data switching system shown in FIG. 1.

Reference is first made to FIG. 2 in which the part of the central processor 111 is shown which is closely involved in the formation of a quasi-circuit. FIG. 2 shows: the central store CM comprising the address selection register SR (16 bits) and the storage register MR (32 bits); the address register AR; the address arithmetic unit AAU (18 bits) with the control unit ACC; the data arithmetic unit DAU (eight bits) with the control unit DAC; a register YR (two bits) with a count-down unit SU; an output buffer OB for data output 125; a generator NG for the 18-bit binary number 00 . . . 011 (= 3, decimal); and a plurality of gates having the letter P as a common reference and a number as an individual reference. The gates have a control input which is represented by a short line segment which is provided with an arrow which terminates at the symbol of the gate. The gates are controlled by the control unit shown in FIG. 3.

Figure 3:
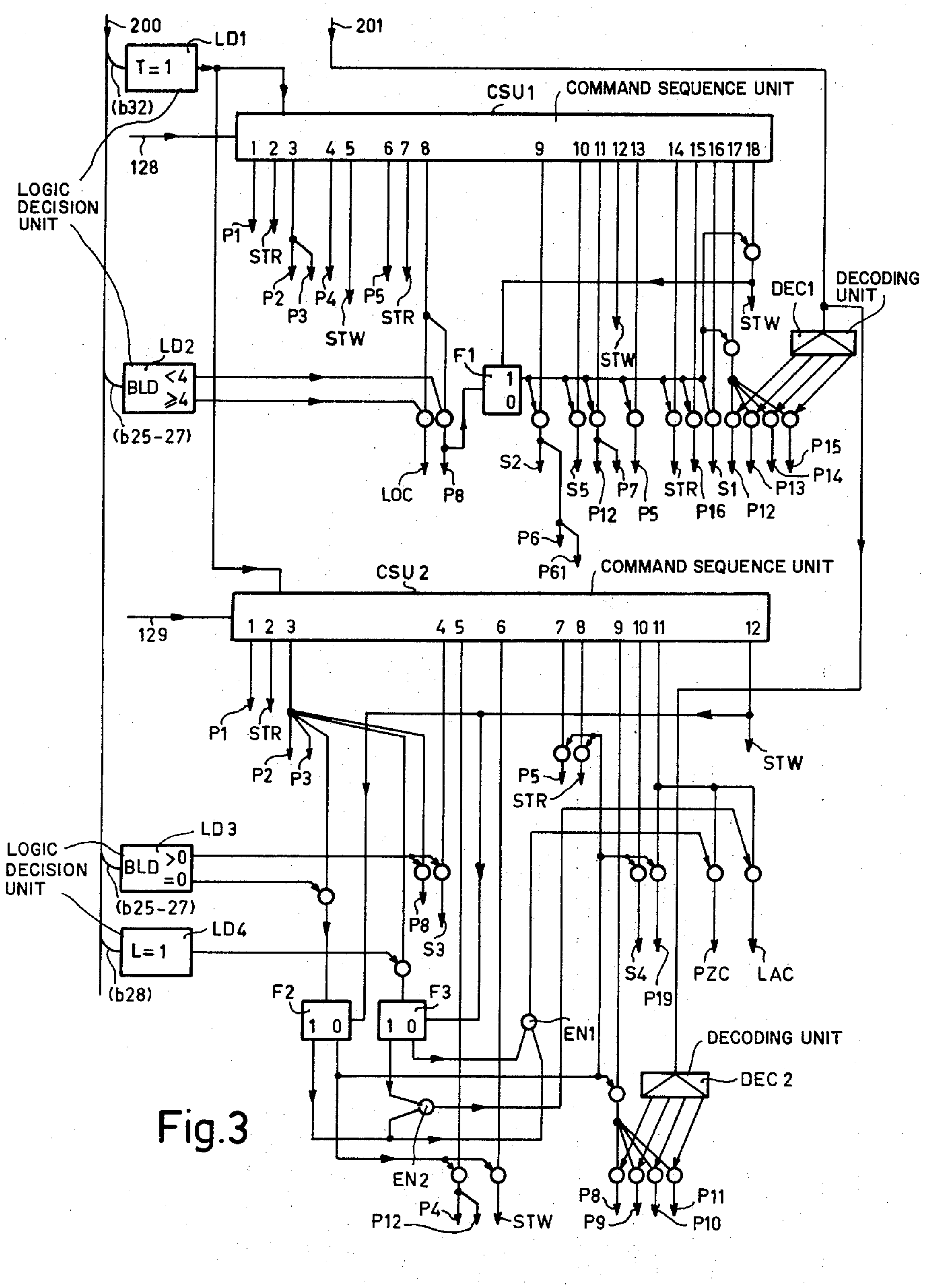
FIG. 3 is a diagram of part of the control unit of the central processor.

FIG. 3 shows: a "command sequence unit" CSU1, which is provided with 18 "command lines" (numbered from 1 to 18) for controlling "incoming transports"; a "command sequence unit" CSU2, which is provided with 12 "command lines" (numbered 1 to 12) for controlling "outgoing transports"; four logic decision units LD1, LD2, LD3 and LD4; three flipflops F1, F2, and F3; two decoding units DEC1 and DEC2, two AND-gates EN1 and EN2 and a plurality of other gates. These gates have no references; their location in the diagram can be simply derived from the following description. Control lines which depart from the control unit shown in FIG. 3 and enter the part of the central processor of FIG. 2 terminate in FIG. 3 in an arrow which is provided with the reference to the gate or the control input which is controlled by the signal of the control line.

The references 117, 125 and 120 of FIG. 1, denoting the data input, the data output and the address input of the central processor, respectively, are repeated in FIG. 2. The references 200 and 201 in FIG. 2 relate to two lines which extend to the control unit shown in FIG. 3. These references are repeated in FIG. 3. A reference in the FIGS. 2 and 3 such as: (*b*1–8) with a reference to a line means that by weight of this line information is transmitted from or to the bit positions bearing the numbers 1 to 8 of the register connected to the line.

Permanently associated with each telegraph line is a storage location (of the central store CM) for "incoming transports" and a storage location for "outgoing transports." Reference is made to the former storage location by the symbolic address X; reference is made to the second storage location by the symbolic address Y. The two storage locations are referred to as incoming line register and as outgoing line register, respectively.

Telegraph lines for which the data switching system must operate in the TELEX mode will be referred to hereinafter as TELEX lines. An additional storage location having the symbolic address Y + 1 is permanently associated with each TELEX line. This storage location has a function for "incoming transports" and a function for "outgoing transports." The binary number which corresponds to the symbolic address Y + 1 is 1 higher than the binary number corresponding to the symbolic address Y. The storage locations Y and Y + 1 are together referred to as outgoing line register. The contents of the storage location Y constitute the first word of the outgoing line register; the contents of storage location Y + 1 constitute the second word of the outgoing line register.

Figure 4:
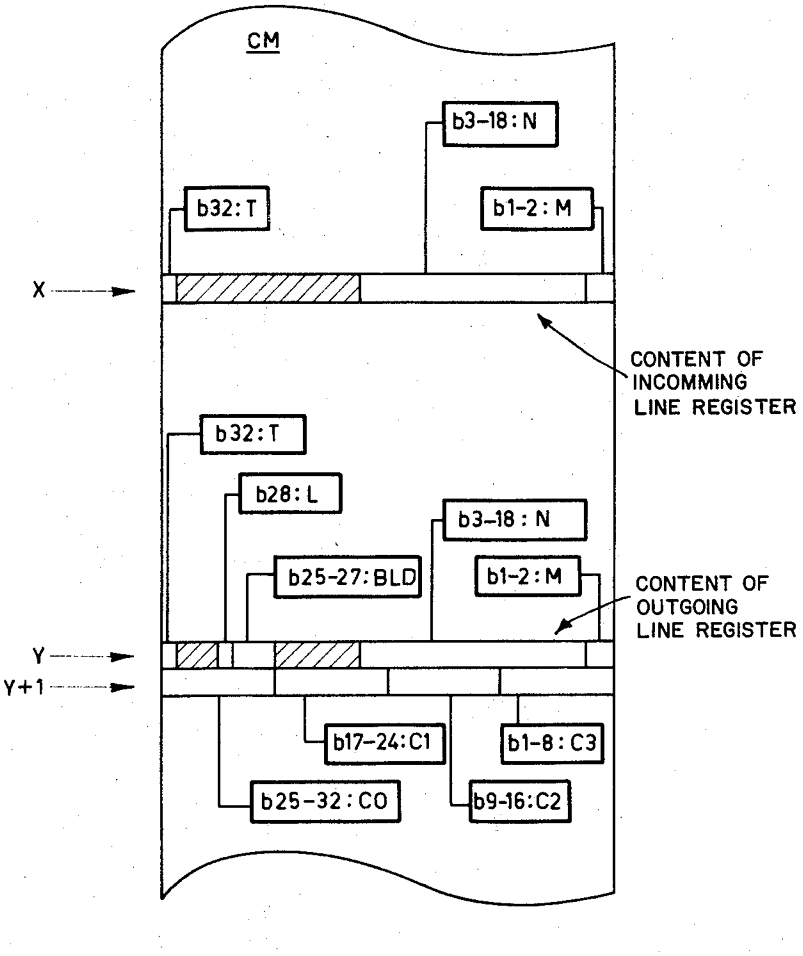
FIG. 4 illustrates the format of the words of the central store which are allotted to TELEX lines.

The format of the words of an incoming line register and an outgoing line register for a TELEX line is illustrated in FIG. 4. The word length is 32 bits.

The format of the word of an incoming line register (address X) is as follows:

- *b* 1 – 2, form the M field; this specifies a character location (eight bits) in the second word of an outgoing line register in which a received character can be stored,
- *b* 3 – 18, form the N field; this specifies the address of the first word of an outgoing line register.
- *b* 19 – 31, are not used,
- *b* 32, forms the T field, T = 1 specifies that the TELEX mode is applicable.

The format of the first word of an outgoing line register (address Y) is as follows:

- *b* 1 – 2, form the M field; this specifies a character location in the second word (address Y + 1) from where a character can be extracted for the next transmission,
- *b* 3 – 18, form the N field; this specifies the address Y + 1,
- *b* 19 – 24, are not used,
- 1 *b* 25 – 27, form the BLD field; this specifies the difference between the binary numbers of the M fields of the outgoing line register and the incoming line register which is associated with the incoming side of the connection,
- *b* 28, forms the L field; L = 1 specifies that the last character of the incoming side of the connection has been received,
- *b* 29 – 31, are not used,
- *b* 32, forms the T field; T = 1 specifies that the TELEX mode is applicable.

In the second word of the outgoing line register four characters of 8 bits can be stored:

- *b* 1 – 8, form the fourth character position C3, address : 11,

*b* 9 – 16, form the third character position C2, address : 10,

*b* 17 – 24, form the second character position C1, address : 01,

*b* 25 – 32, form the first character position CO, address : 00.

Hereinafter it will be described how a one-way connection for the transmission of messages from a TELEX line to another TELEX line is established. For duplex traffic, two one-way connections are required. The forward connection and the return connection are established in the same manner in this case. Only one of these connections will be considered. Hereinafter, I is assumed to be the address of the incoming line register of the TELEX line which is associated with the incoming side of the one-way connection under consideration; Y is assumed to be the address of the outgoing line register of the TELEX line which is associated with the outgoing side of the connection. Consequently, the addresses X and Y now refer to the line register for the "incoming transports" and the line register for the "outgoing transports," respectively, of the same one-way connection.

In the N field of the incoming line register X the address Y of the outgoing line register of the connection is specified; in the M field of the incoming line register X the address 11 of character position C3 of the second word of the outgoing line register is specified for a start.

In the M field of the outgoing line register Y also the address 11 of character position C3 is specified for a start; the BLD field is adjusted to 000, which indicates that the difference between the binary numbers of the M fields of the two registers is 0 (decimal). The L field is initially adjusted to 0.

"INCOMING TRANSPORTS"

An "incoming transport" ultimately causes a signal to be applied to the line 128 (FIG. 1), the said signal activating the command-sequence unit CSU1 (FIG. 3).

This unit then applies a succession of control signals to the command lines 1 to 18. Each command line causes one or more simultaneous events to take place by way of the control signal; these events will be separately described for each command line.

The command line 1 activates gate P1, with the result that the address X of the incoming line register is transported to the address selection register SR.

The command line 2 applies a "read command" to the control input STR of the central store CM. As a result, the contents of storage location X are transferred to the storage register MR.

If the contents of bit 32 of the storage register MR is a 1 (T = 1), the logic decision unit LD1 is actuated (line 200), and this unit applies a signal to the command sequence unit CSU1, with the result that the latter continues to operate. (For T = 0, the "message mode" is adjusted. In this context, only the case where the TELEX mode is performed is considered: so T = 1).

The command line 3 activates the gates P2 and P3. By way of gate P2, the contents of the bits 1 to 18 of the storage register MR are transferred to the address register AR. (This register then contains the M field and the N field of the incoming line register). By way of gate P3, the contents of the bits 1 and 2 of the storage register MR are transferred to the register YR. (This register then contains the M field of the incoming line register).

The command line 4 activates the gate P4, with the result that the contents of the register YR, reduced by 1 (decimal) by the count-down unit SU are transferred to the bits 1 and 2 of the storage register MR. (These bits then contain the M field of the incoming line register which has been reduced by 1).

The command line 5 applies a "write command" to the control input STW of the central store CM. As a result, the contents of the storage register MR are transferred to the storage location X. (This storage location now contains the same information in the T field and the N field as previously; the character address in the M field has been reduced by 1 in preparation of the next "incoming transport." For example, if the character address was initially 11, it is now 10).

The command line 6 activates gate P5, with the result that the contents of the bits 3 to 18 of the address register AR are transferred to the address selection register SR. (This register then contains the N field of the incoming line register, which specifies the address Y of the outgoing line register).

The command line 7 applies a read command to the control input STR of the central store CM, with the result that the contents of the storage location Y are transferred to the storage register MR.

The command line 8 causes the appearance of one of two events which exclude each other, depending on whether the BLD field of the outgoing line register specifies a number smaller than 4 (decimal) or a number larger than or equal to 4 (decimal). If the content of the bits 25 to 27 of the storage register MR is larger than or equal to 4 (BLD ≥ 4), the logic decision unit LD2 activates a gate which is incorporated in the command line 8, with the result that a signal is produced on the output LOC. If BLD < 4, the unit LD2 produces a signal on another gate, with the result that the gate P8 is activated and the flip-flop F1 is set to the "1"-state. (The latter is the normal case).

The description of the case where BLD < 4 will now be continued. In this case, the flipflop F1 is in the "1"—state, and activates a plurality of gates which are incorporated in the command lines 9 to 11 and 13 to 18, with the result that these gates allow passage of the control signals. Due to the activation of gate P8, the contents of the bits 25 to 32 of the storage register MR are transferred to part A of the data arithmetic unit DAU (part A then contains the contents of the storage location Y as from bit 25 upwards. The content of the bits 1 to 3 of part A is the BLD field of the outgoing line register).

The command line 9 activates the control input S2 of control unit DAC and activates the gates P6 and P61. Due to the activation of control input S2, the data arithmetic unit DAU forms the sum of the contents of part A and 00000001 (binary), i.e., the sum (A) + 1 (decimal). (The data arithmetic unit DAU then contains the BLD field of the outgoing line register increased by 1 in the bits 1 to 3, and in the bits 4 to 8 the unchanged contents of the bits 28 to 32 of storage location Y). By way of gate P6, the contents of the address register AR are transferred to part A of the address arithmetic unit AAU and, by way of gate P61, the 18-bit binary number 00 . . . 011 (= 3, decimal) is introduced in part B. (Part A then contains the N field and the M field of the incoming line register).

The command line 10 activates control input S5 of the control unit AAC, with the result that in the arithmetic unit AAU the sum is formed of the contents of part A, the contents of part B, and the 18-bit binary number 00 . . . 001 (= 1, decimal), i.e., the sum: (A) + (B) + 1 (decimal). (The address arithmetic unit AAU then contains the address Y + 1 in the bits 3 to 18, and the unchanged M field of the incoming line register in the bits 1 and 2).

The command line 11 activates the gates P7 and P12. By way of gate P7, the contents of arithmetic unit AAU are transferred to the address register AR. By way of gate P12, the contents of arithmetic unit DAU are transferred to the line 25 to 32 of the storage register MR.

The command line 12 applies a write command to the control input STW of the central store CM, with the result that the contents of the storage register MR are transferred to the storage location Y. (The contents of the M field, the N field, the L field and the T field are the same as previously; the BLD field has been increased by 1).

The command line 13 activates the gate P5, with the result that the contents of the bits 3 to 18 of the address register AR are transferred to the address selection register SR. (This register now contains the address Y + 1).

The command line 14 applies a read command to the control input STR of the central store CM, with the result that the contents of storage location Y + 1 are transferred to the storage register MR.

The command line 15 activates gate P16, with the result that the received character of the data input 117 is transferred to part B of the data arithmetic unit DAU.

The command line 16 activates control input S1 of the control unit DAC, with the result that data arithmetic unit DAU forms the sum of the contents of part B and the binary number 00000000 (= 0, decimal), i.e., the sum : (B) + 0 (decimal). (The data arithmetic unit then contains the received character).

The command line 17 activates one of the gates P12, P13, P14 and P15, depending on the character address specified by the bits 1 and 2 of the address register AR. (The content of these bits 1 and 2 is the N field of the incoming line register). These bits activate, by way of line 201 and decoding unit DEC1, one of the four gates incorporated in command line 17. If the bits 1 and 2 specify, for example, the character address 11, the gate P 15 is activated with the result that the received character is transferred from the data arithmetic unit DAU to the bits 1 to 8 of the storage register MR.

The command line 18 applies a write command to the control input STW of the central store CM and resets the flipflop F1 to the "0"-state. Due to the activation of the control input STW, the contents of the storage register MR are transferred to the storage location Y + 1. The received character is now stored in the second word of the outgoing line register, at the character address specified by the M field of the incoming line register. The "incoming transport" is now terminated. In this manner, the first character is stored in character position C3, the second character in character position C2, the third character in character position C1, the fourth character in character position C0, the fifth character in character position C3, and so on in a cyclic sequence, circulating along the different character positions.

If after the reading of the first word of the out-going line register it is determined — by the logic decision unit LD2 — that BLD ≥ 4, the flipflop F1 is not set to the "1"-state, but instead the output LOC is activated. As a result, the control signals of the command lines 9 to 11 and 13 to 18 have no effect. Only command line 12 has an effect; this line activates the control input STW of the central store CM, with the result that the contents of the storage register MR are transferred — unchanged — to the storage location Y. (The storage location Y then contains the same information as previously). The received character is lost in this procedure.

In the case BLD ≥ 4, the second word of the outgoing line register is filled with four characters which have not yet been transmitted; the second word is then "full." This case will occur only if the TELEX transmitter which is connected to the TELEX line has an abnormally high transmission rate.

Due to the activation of the output LOC, the corresponding input of the output buffer OB (FIG. 2) is activated, with the result that by way of the data output 125 a "lost character signal" is applied to the multiplex unit. The multiplex unit reacts thereto by transmitting an "interrupt request" by way of the direct channel 135, which causes an interruption of the program of the central processor.

"OUTGOING TRANSPORTS"

An "outgoing transport" ultimately results in the supply of a signal to the line 129 (FIG. 1), the said signal activating the command sequence unit CSU2. This unit applies control signals in succession to the command lines 1 to 12.

The command line 1 activates gate P1, with the result that the address Y of the outgoing line register is transferred to the address selection register SR.

The command line 2 activates the control input STR of the central store CM, with the result that the contents of storage location Y are transferred to the storage register MR.

The content of bit 32 of the storage register MR is transferred, by way of line 200, to the logic decision unit LD1. In the TELEX mode this bit is a 1 (T = 1). The unit LD1 is activated in reaction thereto, and applies a signal to the command sequence unit CSU2, with the result that the latter continues to operate.

The contents of the bits 23 to 27 of the storage register MR are applied, by way of line 200, to the logic decision unit LD3. The latter determines whether the binary number is larger than 0 (decimal) (BLD > 0) or equal to 0 (decimal) (BLD = 0).

The content of bit 28 of the storage register MR is applied, by way of line 200, to the logic decision unit LD4. The latter determines whether the bit is a 1(L = 1) or a 0 (L = 0).

First the case : BLD > 0, L = 0 will be further described. The logic decision unit LD3 then activates a gate in the command line 3 and a gate in the command line 4.

The command line 3 activates the gates P2, P3 and P8. By way of gate P2, the contents of the bits 1 to 18 of the storage register MR are transferred to the address register AR. (The address register then contains the M field and the N field of the outgoing line register). By way of P3, the contents of the bits 1 and 2 of the storage register MR are transferred to the register YR. (This register then contains the M field of the outgoing line register). By way of gate P8, the contents of the bits 25 to 32 of the storage register MR are transferred to part A of the data arithmetic unit DAU. (Part A then contains the contents of the bits 25 and higher of storage location Y. The content of the bits 1 to 3 of part A is the BLD field of the outgoing line register).

The command line 4 activates control input S3 of control unit DAC, with the result that the data arithmetic unit DAU forms the difference between the contents of part A and 00000001 (= 1, decimal), which means the difference: (A) − 1 (decimal). (The data arithmetic unit DAU then contains the BLD field of the outgoing line register which has been decreased by 1 in the bits 1 to 3 and the unchanged contents of the bits 28 to 32 of the storage location Y in the bits 4 to 8).

The command line 5 activates the gates P4 and P12. (Flipflop F2 is in the "0"-state and activates the gates connected in the command lines 5 to 11). By way of gate P4, the contents of the register YR, decreased by 1 (decimal), are transferred to the bits 1 and 2 of the storage register MR. (These bits then contain the M field of the outgoing line register which has been reduced by 1). By way of gate P12, the contents of data arithmetic unit DAU are transferred to the bits 25 to 32 of the storage register MR. (These bits then contain the BLD field of the outgoing line register which has been reduced by 1).

The command line 6 activates the control input STW of the central store CM, with the result that the contents of the storage register MR are transferred to storage location Y. (The contents of the N field, the L field and the T field are the same as previously; the M field and the BLD field have been reduced by 1).

The command line 7 activates gate P5, with the result that the contents of the bits 3 to 18 of the address register AR are transferred to the address selection register SR. (This register then contains the N field of the outgoing line register, which specifies the address Y + 1).

The command line 8 activates the control input STR of the central store CM, with the result that the contents of storage location Y + 1 are transferred to the storage register MR.

The command line 9 activates one of the gates P8, P9, P10 and P11 in accordance with the character address specified by the bits 1 and 2 of the address register AR. (The content of these bits 1 and 2 is the M field of the outgoing line register). These bits activate, by way of line 201 and decoding unit DEC2, one of the four gates connected in command line 9. If the bits 1 and 2 specify, for example, the address 11, the gate P11 is activated, with the result that the contents of the bits 1 to 8 of the storage register MR are transferred to part A of the data arithmetic unit DAU. (Part A then contains the character of character position C3 of the outgoing line register).

The command line 10 activates the control input S4 of control unit DAC, with the result that data arithmetic unit DAU forms the sum of the contents of part A and 00000000 (= 0, decimal), which means the sum : (A) + 0 (decimal). (The data arithmetic unit then contains the character to be transmitted).

The command line 11 activates the gate P19, with the result that the contents of the data arithmetic unit DAU are transferred to the output buffer OB. The character is then transferred to the multiplex unit by way of the data output 125.

The command line 12 activates the control input STW of the central store CM, with the result that the contents of the storage register MR are transferred to the storage location Y + 1. The "outgoing transport" is now terminated. In this manner the first character is derived from character position C3, the second character from character position C2 and so on in a cyclic sequence, circulating along the different character positions.

THE CASE : BLD = 0, L = 0

In this case, there is no character read for transmission in the second word of the outgoing line register; a "pause character" is transferred to the multiplex unit. The multiplex unit then transmits a pause signal (continuous stop polarity) for the duration of one telegraphy character.

The logic decision unit LD3 de-activates gate connected in command line 4 and activates a gate with the result that command line 3 sets the flipflop F2 to the "1"-state. In this case, the command lines 4 to 10 are blocked.

The command line 11 activates the control input PZC of the output buffer OB. (A gate which is connected in the command line 11 is activated by the flipflops F2 and F3). The output buffer OB then transmits a pause character to the multiplex unit via the data output 125.

The command line 12 activates the control input STW of the central store CM and resets the flipflop F2 to the "0"-state. Due to the activation of the control input STW, the contents of the storage register MR are transferred to the storage location Y. (This storage location now contains the same information as previously). The "outgoing transport" is now terminated.

THE CASE : BLD = 0, L = 1

If the "break criterion" is detected on the incoming side of the connection, indicating that the connection can be released, a 1 is written in the L field of the outgoing line register by the program of the central processor. As soon as the state BLD 1 0, L = 1 is detected, a "last character signal" is transmitted to the multiplex unit, with the result that the multiplex unit stops requesting characters.

The logic decision units LD3 and LD4 activate gates, with the result that command line 3 sets the flipflops F2 and F3 to the "1"-state. The command lines 4 to 10 are also blocked in this case.

The command line 11 activates the control input LAC of the output buffer OB. (The flipflops F2 and F3 activate, by way of an AND-gate EN2, a gate which is connected in the command line 11). Due to the activation of control input LAC, a "last character signal" is transmitted to the multiplex unit by way of data output 125.

The command line 12 activates the control input STW of the central store CM, with the result that the contents of the storage register MR are transferred to storage location Y + 1. (This storage location now contains the same information as before). The "outgoing transport" is now finished.

For the purpose of illustration it can be stated that in a given central processor an "incoming transport" lasts 10.8 μs, and an "outgoing transport" 5.8 μs.

During an "incoming transport" the address Y + 1 of the second word of the outgoing line register is calculated from the address Y of the N field of the incoming line register. However, the address Y + 1 is also present in the N field of the first word of the outgoing line register. For selecting the second word use could be made of this latter address. The two methods are equivalent as regards their ultimate result; they differ only as regards the processing of addresses.

The second method offers the possibility of arbitrary selection of the address of the second word of the outgoing line register, i.e., independent of Y. Assume that this address is symbolically denoted by Z. The address Z is then stored in the N field of the first word (address Y) of the outgoing line register. During an "incoming transport," after selection of the first word of the outgoing line register (by means of the address Y of the N field of the incoming line register), the second word thereof is selected by means of the address Z of the N field of the first word. The "outgoing transports" remain unchanged.

When use is made of an arbitrary address for the second word of the outgoing line register, this register consists of a word having the address Y and a word having the address Z. The address Z can be chosen at random, but a fixed Z exists for each Y. It is to be noted that Z is, like Y + 1, a value which is determined once for each TELEX line, and which does not change as the connection changes.

The outgoing line register comprises the word with the address Y and, by implication (the reference to the address Z in the word having the address Y), the word having the address Z. Y is again assumed to be the address of the outgoing line register, which in this case contains the words with the addresses Y and Z (instead of the words having the addresses Y and Y + 1).

If the rate at which the characters are received from the incoming side of the connection (="receive rate") exceeds the rate at which the characters are transmitted on the outgoing side (= "transmission rate"), the second word of the outgoing line register will be filled until the state is achieved where the word is full (BLD ≥ 4). When this state is reached, the next character received is lost. This situation can be avoided by choosing the transmission rate to be higher than the highest receive rate, which follows from the nominal rate increased by the maximum tolerance thereof. If the CCITT Code No. 2 (start-stop, five-element code), having a stop element of 1.5 units, is used on the TELEX lines, a rate variation of ± 0.75 percent (CCITT recommendation) can be permitted on the incoming side of the connection by a reduction of the stop element to 1.42 units. In fact, a maximum of ± 1.1 percent. For extreme rate variations, the stop element can possibly be reduced to 1.28 units. (Rate variations of ± 2.2 percent). The reduction of the stop element is programmed into the multiplex unit in advance by means of a command via the direct channel.

What is claimed is:

1. A data switching system for establishing data signal communication connections between receive lines through which the data signals are received and send lines through which data is transmitted, comprising communication unit means connected to said receive lines and said send lines for providing a request signal in response to the reception of a given quantity of data (a character) and after transmission of a character, a central processor connected to said communication units for successively granting the communication units which send a request signal access to the control store for transferring a character between the communication unit and the central store, an incoming and an outgoing line register of the central store being permanently associated with each of said receive lines and send lines, respectively, first addressing means responsive to a connection between a receive line and a send line for storing the address of the outgoing line register in the incoming line register of the central store, the outgoing line register comprising a number of character positions for storing characters, the central processor further comprising means responsive to a request signal originating from the communication unit connected to the receive lines for reading the contents of the incoming line register of the connection and for subsequently selecting the outgoing line register whose address is specified by the contents of the incoming line register and for subsequently storing the received character in a character location of the outgoing line register, the central processor further comprising means responsive to a request signal originating from the communication unit connected to the transmit lines for reading the contents of the outgoing line register of the connection and for subsequently transferring a character from a character location of the outgoing line register to the communication unit from which the request signal originates.

2. A data switching system as claimed in claim 1, wherein an incoming line register comprises one storage location of the central store, an outgoing line register comprising two storage locations (words) of the central store, the address of the second storage location being stored in the first storage location of the outgoing line register, the central processor further comprising means responsive to reading the contents of the incoming line register of a connection for calculating the address of the second storage location of the outgoing line register from the address specified by the contents of the incoming line register and for deducing this address from the contents of the first word of the outgoing line register, and for subsequently storing the received character in a character location of the second storage location of the outgoing line register, the central processor further comprising means responsive to a request signal originating from the outgoing side of a connection by reading the contents of the first storage location of the outgoing line register of the connection and for subsequently reading the contents of the storage location whose address is specified by the contents of the first storage location of the outgoing line register, and for finally transferring a character from a character location of the second storage location of the outgoing line register to the communication unit from which the request signal originates.

3. Data switching systems as claimed in claim 2, wherein in an incoming line register of a connection a character address is stored which specifies a character location of the outgoing line register of the connection, the central processor further comprising means responsive to reading the contents of an incoming line register for adding a constant (−1) to the character address, the first storage location of an outgoing line register of a connection containing a character address which specifies the character location of the second storage location of the outgoing line register, the central processor, after having read the contents of the first storage location of the outgoing line register, adding the (said) constant (−1) to the character address.

4. Data switching systems as claimed in claim 3, wherein in the first storage location of the outgoing line register of a connection a number is stored which specifies the number of characters of the second storage location of the outgoing line register which have not yet been transmitted, the central processor comprising means for adding, after having read the contents of the first storage location, a constant (+1) to the number when a character is transferred to the second storage location, and adding the (said) constant of opposed sign (− 1) to the number when a character is transferred from the second storage location.

* * * * *

PO-1050
(5/69)

UNITED STATES PATENT OFFICE
CERTIFICATE OF CORRECTION

Patent No. 3,823,256 Dated July 9, 1974

Inventor(s) RUDOLPH LOUIS WITTEBOL

It is certified that error appears in the above-identified patent and that said Letters Patent are hereby corrected as shown below:

IN THE SPECIFICATION

Col. 6, line 53, "lb 25-27" should be --b 25-27--;

Col. 12, line 25, after "de-activates" insert --the--;

IN THE CLAIMS

Claim 2, line 3, after "location" insert --(word)--;

Signed and sealed this 24th day of December 1974.

(SEAL)
Attest:

McCOY M. GIBSON JR.
Attesting Officer

C. MARSHALL DANN
Commissioner of Patents